United States Patent
Kuramitsu et al.

(10) Patent No.: US 11,565,744 B2
(45) Date of Patent: Jan. 31, 2023

(54) ROTARY ELECTRIC MACHINE CONTROL DEVICE AND ELECTRIC POWER STEERING DEVICE USING SAME

(71) Applicant: DENSO CORPORATION, Kariya (JP)

(72) Inventors: Shuji Kuramitsu, Kariya (JP); Hideki Kabune, Kariya (JP); Koichi Nakamura, Kariya (JP); Atsuko Oka, Kariya (JP); Masaya Taki, Kariya (JP)

(73) Assignee: DENSO CORPORATION, Kariya (JP)

( * ) Notice: Subject to any disclaimer, the term of this patent is extended or adjusted under 35 U.S.C. 154(b) by 801 days.

(21) Appl. No.: 16/534,101

(22) Filed: Aug. 7, 2019

(65) Prior Publication Data

US 2019/0359253 A1 Nov. 28, 2019

Related U.S. Application Data

(63) Continuation of application No. PCT/JP2018/004524, filed on Feb. 9, 2018.

(30) Foreign Application Priority Data

Feb. 10, 2017 (JP) .............................. JP2017-023438

(51) Int. Cl.
*H02P 29/028* (2016.01)
*B62D 5/04* (2006.01)
(52) U.S. Cl.
CPC ........... *B62D 5/0481* (2013.01); *B62D 5/046* (2013.01); *H02P 29/028* (2013.01)
(58) Field of Classification Search
CPC ...... H02P 29/028; B62D 5/0481; B62D 5/046

USPC ........................................................ 318/445
See application file for complete search history.

(56) References Cited

U.S. PATENT DOCUMENTS

| | | | | |
|---|---|---|---|---|
| 5,969,919 | A * | 10/1999 | Kobayashi | ........... B62D 5/0484 318/446 |
| 2005/0159866 | A1 | 7/2005 | Takeuchi et al. | |
| 2011/0156629 | A1 | 6/2011 | Satou et al. | |
| 2013/0257328 | A1 | 10/2013 | Arai et al. | |
| 2014/0009093 | A1 | 1/2014 | Suzuki | |
| 2014/0054103 | A1 | 2/2014 | Kezobo et al. | |
| 2016/0329849 | A1 | 11/2016 | Nakajima et al. | |

(Continued)

FOREIGN PATENT DOCUMENTS

| | | | |
|---|---|---|---|
| JP | 2003-026020 A | 1/2003 | |
| JP | 2009-040178 A | 2/2009 | |

(Continued)

*Primary Examiner* — Kawing Chan
(74) *Attorney, Agent, or Firm* — Maschoff Brennan

(57) ABSTRACT

A rotary electric machine control device includes multiple drive circuits provided for respective winding sets in a rotary electric machine, and multiple control units. When combinations of the winding sets and configurations provided correspondingly to the respective winding sets are defined as systems, the control units are provided for the respective systems. Each of the control units controls energization of the winding set provided correspondingly, and monitors an abnormality of a monitoring target. Each of the control units performs an abnormality detection time backup control during a period from detection of the abnormality of the monitoring target to confirmation of the abnormality, and performs an abnormality confirmation time backup control when the abnormality is confirmed.

14 Claims, 10 Drawing Sheets

(56) References Cited

U.S. PATENT DOCUMENTS

| | | |
|---|---|---|
| 2017/0085205 A1 | 3/2017 | Koseki et al. |
| 2017/0237377 A1 | 8/2017 | Furukawa et al. |
| 2018/0127023 A1 | 5/2018 | Füzes et al. |
| 2018/0175779 A1* | 6/2018 | Koseki .................. H02P 29/028 |
| 2018/0290682 A1 | 10/2018 | Nampei et al. |
| 2019/0263445 A1 | 8/2019 | Füzes et al. |

FOREIGN PATENT DOCUMENTS

| | | |
|---|---|---|
| JP | 2011-131860 A | 7/2011 |
| JP | 2012-157140 A | 8/2012 |
| JP | 2013-031356 A | 2/2013 |
| JP | 2014-007784 A | 1/2014 |
| JP | 2014-007880 A | 1/2014 |
| JP | 2014-014240 A | 1/2014 |
| JP | 2016-0181963 A | 10/2016 |

* cited by examiner

FIG. 6

| ABNORMALITY OCCURRENCE LOCATION | ABNORMALITY DETECTION TIME BACKUP CONTROL | ABNORMALITY CONFIRMATION TIME BACKUP CONTROL |
|---|---|---|
| (1) TORQUE SENSOR, ROTATION ANGLE SENSOR | (A) SINGLE-SYSTEM DRIVING | (A) SINGLE-SYSTEM DRIVING |
| | (B) INTER-MICROCOMPUTER COMMUNICATION SUBSTITUTE | (A) SINGLE-SYSTEM DRIVING |
| | | (B) INTER-MICROCOMPUTER COMMUNICATION SUBSTITUTE |
| | (C) CROSS INPUT SUBSTITUTE | (A) SINGLE-SYSTEM DRIVING |
| | | (C) CROSS INPUT SUBSTITUTE |
| (2) CURRENT SENSOR | (A) SINGLE-SYSTEM DRIVING | (A) SINGLE-SYSTEM DRIVING |
| | (C) CROSS INPUT SUBSTITUTE | (A) SINGLE-SYSTEM DRIVING |
| | | (C) CROSS INPUT SUBSTITUTE |
| (3) MOTOR SYSTEM, POWER SUPPLY SYSTEM | (A) SINGLE-SYSTEM DRIVING | (A) SINGLE-SYSTEM DRIVING |
| (4) VEHICLE COMMUNICATION NETWORK, TEMPERATURE SENSOR | (A) SINGLE-SYSTEM DRIVING | (A) SINGLE-SYSTEM DRIVING |
| | (B) INTER-MICROCOMPUTER COMMUNICATION SUBSTITUTE | (A) SINGLE-SYSTEM DRIVING |
| | | (B) INTER-MICROCOMPUTER COMMUNICATION SUBSTITUTE |
| | | (D) CURRENT LIMIT |
| | (C) CROSS INPUT SUBSTITUTE | (A) SINGLE-SYSTEM DRIVING |
| | | (C) CROSS INPUT SUBSTITUTE |
| | | (D) CURRENT LIMIT |
| | (D) CURRENT LIMIT | (A) SINGLE-SYSTEM DRIVING |
| | | (D) CURRENT LIMIT |

# ROTARY ELECTRIC MACHINE CONTROL DEVICE AND ELECTRIC POWER STEERING DEVICE USING SAME

CROSS REFERENCE TO RELATED APPLICATIONS

The present application is a continuation application of International Patent Application No. PCT/JP2018/004524 filed on Feb. 9, 2018, which designated the U.S. and claims the benefit of priority from Japanese Patent Application No. 2017-23438 filed on Feb. 10, 2017. The entire disclosures of all of the above applications are incorporated herein by reference.

TECHNICAL FIELD

The present disclosure relates to a rotary electric machine control device and an electric power steering device using the rotary electric machine control device.

BACKGROUND

Conventionally, a rotary electric machine control device capable of determining an abnormality has been known.

SUMMARY

The present disclosure provides a rotary electric machine control device includes multiple drive circuits provided for respective winding sets in a rotary electric machine, and multiple control units. When combinations of the winding sets and configurations provided correspondingly to the respective winding sets are defined as systems, the control units are provided for the respective systems. Each of the control units controls energization of the winding set provided correspondingly, and monitors an abnormality of a monitoring target. Each of the control units performs an abnormality detection time backup control during a period from detection of the abnormality of the monitoring target to confirmation of the abnormality, and performs an abnormality confirmation time backup control when the abnormality is confirmed.

BRIEF DESCRIPTION OF DRAWINGS

The above and other objects, features and advantages of the present disclosure will become more apparent from the following detailed description made with reference to the accompanying drawings. In the drawings:

FIG. 6 is an illustrative diagram illustrating an abnormality detection time backup control and the abnormality confirmation time backup control according to the embodiment;

DETAILED DESCRIPTION

In a rotary electric machine control device according to a reference example, a voltage to be applied to an AC rotary machine or a current supplied to the AC rotary machine is used as a state amount, and an abnormality determination is performed by comparing the state quantities. When an abnormality continuation time exceeds a predetermined time, it is determined that an abnormality has occurred, and an abnormality determination flag is set. When the abnormality determination flag is set, the AC rotary machine is stopped.

However, in the case of abnormality determination is performed after the abnormality continuation time exceeds the predetermined time as the reference example, it takes time to determine the abnormality, and therefore, there is a risk that an erroneous output based on the detection value or the like of the abnormality may occur between the detection of the abnormality and the determination of the abnormality.

A rotary electric machine control device according to an aspect of the present disclosure is for controlling driving of a rotary electric machine including a plurality of winding sets, and includes a plurality of drive circuits and a plurality of control units. The drive circuits are provided for the respective winding sets. When combinations of the winding sets and configurations provided correspondingly to the respective winding sets are defined as systems, the control units are provided correspondingly to the respective systems. Each of the control units includes a drive control unit and an abnormality monitoring unit. The drive control unit is configured to control energization of the winding set provided correspondingly. The abnormality monitoring unit is configured to monitor an abnormality of a monitoring target.

The drive control unit is configured to perform an abnormality detection time backup control during a period from detection of the abnormality of the monitoring target to confirmation of the abnormality. In addition, the drive control unit is configured to perform an abnormality confirmation time backup control when the abnormality is confirmed. In the present disclosure, when an abnormality is detected, the drive control unit shifts to the abnormality detection time backup control. Accordingly, compared with a case in which the drive control unit shifts to a backup control after the abnormality is confirmed, a period until shifting to the backup control is shortened, so that an erroneous output of the rotary electric machine can be reduced.

Hereinafter, a rotary electric machine control device according to the present disclosure and an electric power steering device using the rotary electric machine control device will be described with reference to the drawings.

Embodiment

Figure 1:
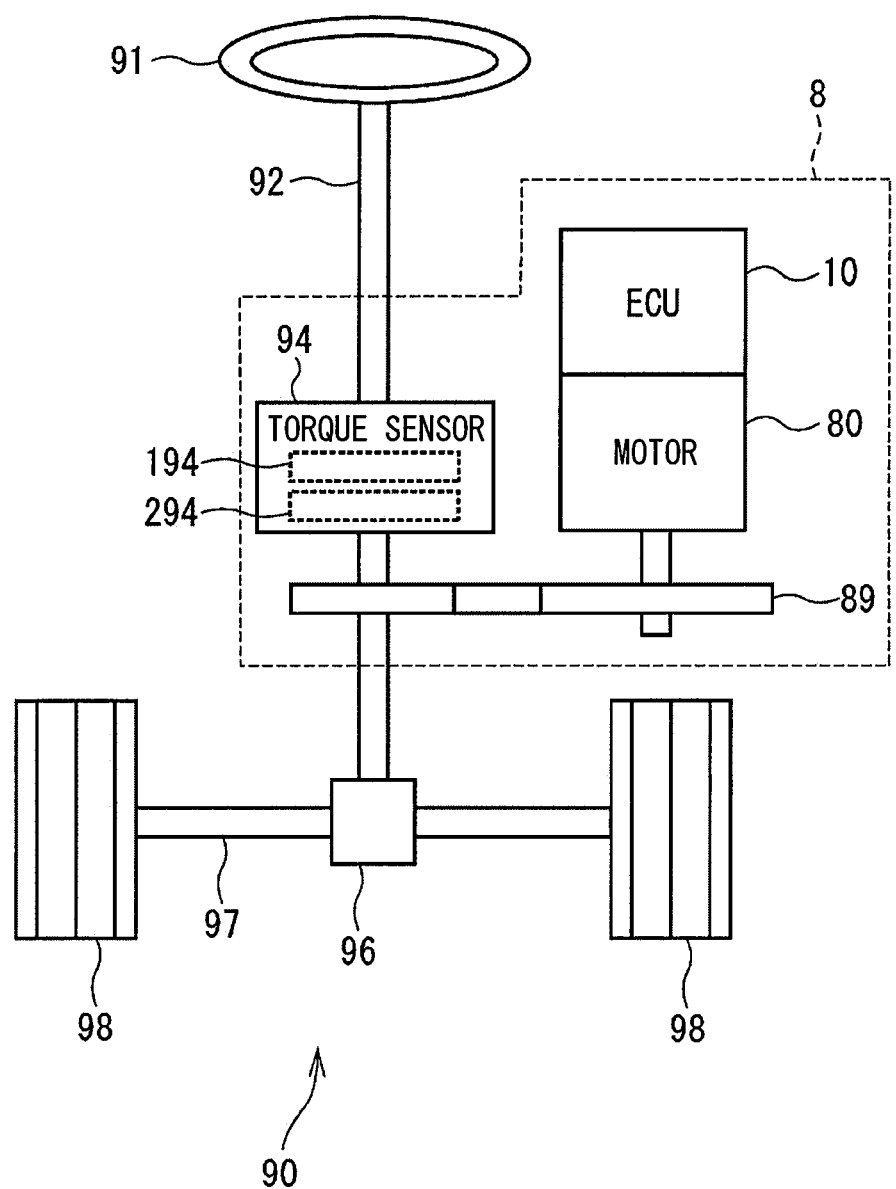
FIG. 1 is a schematic configuration diagram of a steering system according to an embodiment.
Figure 2:
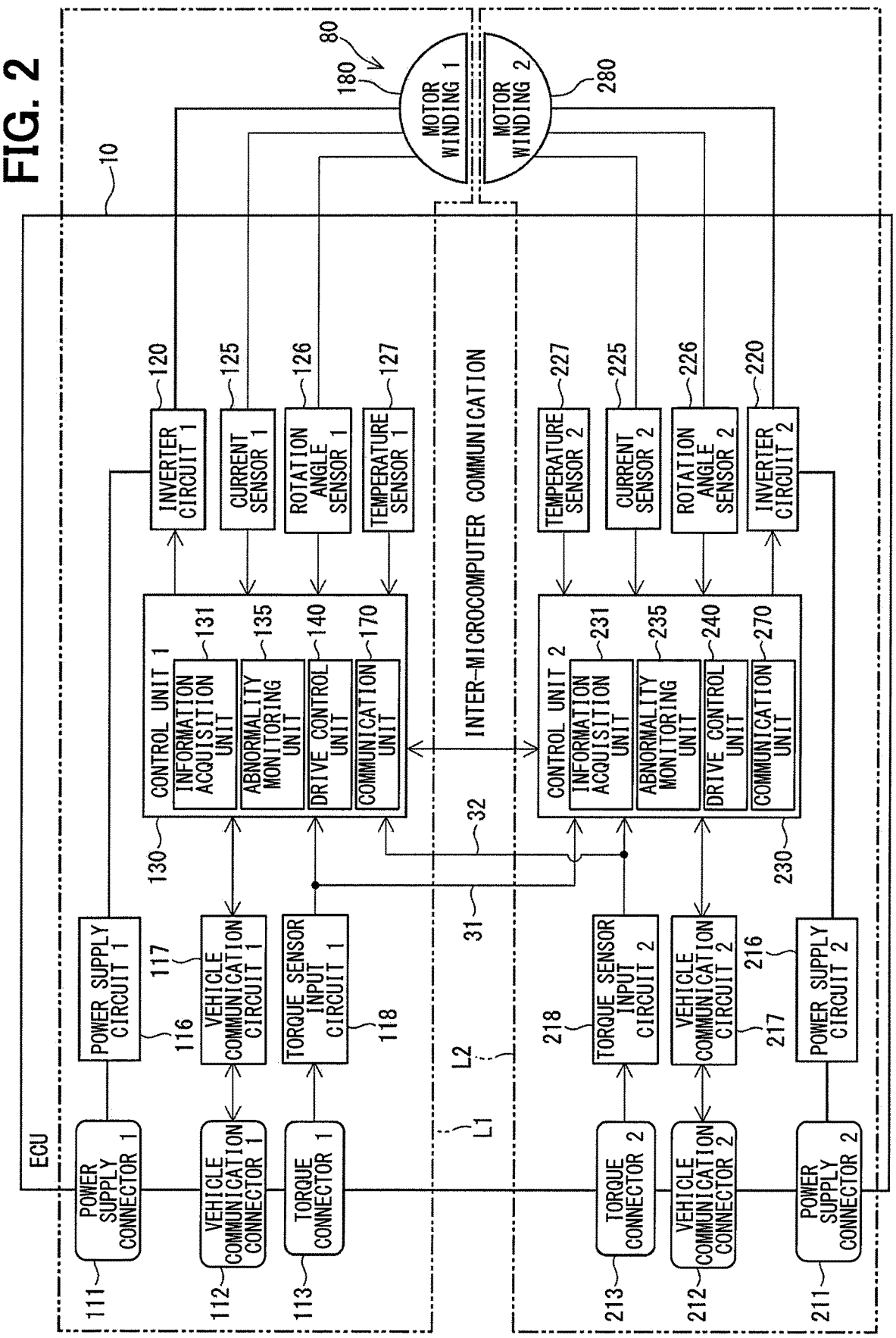
FIG. 2 is a block diagram illustrating a motor control device according to the embodiment.

An embodiment is shown in FIGS. 1 to 9. As shown in FIGS. 1 and 2, a motor control device 10 as a rotary electric machine control device according to the present embodiment is applied to, for example, an electric power steering device 8 for assisting a steering operation of a vehicle together with a motor 80 as a rotary electric machine. In the drawing, the motor control device 10 is referred to as an "ECU". Further, the electric power steering device is appropriately referred to as "EPS".

FIG. 1 shows a configuration of a steering system 90 including the electric power steering device 8. The steering system 90 includes a steering wheel 91 as a steering member, a steering shaft 92, a pinion gear 96, a rack shaft 97, wheels 98, the electric power steering device 8, and the like. The steering wheel 91 is connected to the steering shaft 92. The steering shaft 92 is provided with a torque sensor 94 for detecting a steering torque Ts. A pinion gear 96 is provided at a tip of the steering shaft 92. The pinion gear 96 engages with the rack shaft 97. The pair of wheels 98 is connected to both ends of the rack shaft 97 through tie rods or the like.

When a driver rotates the steering wheel 91, the steering shaft 92 connected to the steering wheel 91 rotates. The rotational movement of the steering shaft 92 is converted into a linear movement of the rack shaft 97 by the pinion gear 96. The pair of wheels 98 is steered to an angle corresponding to the displacement amount of the rack shaft 97.

The electric power steering device 8 includes the motor 80, a reduction gear 89 serving as a power transmission portion for reducing the rotation of the motor 80 and transmitting the reduced rotation to the steering shaft 92, the motor control device 10, and the like. In other words, the electric power steering device 8 according to the present embodiment is a so-called "column assist type", but may be a so-called "rack assist type" which transmits the rotation of the motor 80 to the rack shaft 97. In the present embodiment, the steering shaft 92 corresponds to a "drive target".

The motor 80 outputs an assisting torque for assisting the driver to steer the steering wheel 91, and is driven by an electric power supplied from a battery (not shown) as a power source, and rotates the reduction gear 89 in forward and reverse directions. The motor 80 is a three-phase brushless motor, and includes a rotor and a stator, both of which are not shown. As shown in FIG. 2, the motor 80 has a first motor winding 180 and a second motor winding 280 as a winding set. In the drawings, the first motor winding 180 is referred to as "motor winding 1" and the second motor winding 280 is referred to as "motor winding 2". In other configurations to be described later, a "first" is described as a subscript "1" and a "second" is described as a subscript "2" as appropriate in the drawings.

Hereinafter, a combination of the first motor winding 180, a first inverter circuit 120, a first control unit 130, and the like is referred to as a first system L1, a combination of the second motor winding 280, a second inverter circuit 220, a second control unit 230, and the like is referred to as a second system L2. In the present embodiment, the inverter circuits 120 and 220 correspond to "drive circuits". Hereinafter, a configuration related to the first system L1 is numbered by 100 series, and a configuration related to the second system L2 is numbered by 200 series. In the first system L1 and the second system L2, the same configurations are numbered so that the last two digits are the same. The first system L1 is defined as a subject system for the first control unit 130, and the second system L2 is defined as a subject system for the second control unit 230.

The motor control device 10 includes power supply circuits 116 and 216, vehicle communication circuits 117 and 217, torque sensor input circuits 118 and 218, the inverter circuits 120 and 220, current sensors 125 and 225, rotation angle sensors 126 and 226, temperature sensors 127 and 227, the control units 130 and 230, and so on. The motor control device 10 is provided with power supply connectors 111 and 211, vehicle communication connectors 112 and 212, and torque connectors 113 and 213. The first power supply connector 111 is connected to a first battery (not shown), and the second connector 211 is connected to a second battery (not shown). The connectors 111 and 211 may be connected to the same battery. The first power supply connector 111 is connected to the first inverter circuit 120 through the first power supply circuit 116. The second power supply connector 211 is connected to the second inverter circuit 220 through the second power supply circuit 216. The power supply circuits 116 and 216 are, for example, power supply relays.

The vehicle communication connectors 112 and 212 are connected to a vehicle communication network such as a CAN (controller area network). The vehicle communication network is not limited to the CANs and the vehicle communication network may be any standard such as a CAN-FD (CAN with Flexible Data rate) or a FlexRay. The first vehicle communication connector 112 is connected to the first control unit 130 through the first vehicle communication circuit 117. The second vehicle communication connector 212 is connected to the second control unit 230 through the second vehicle communication circuit 217. As a result, the control units 130 and 230 and the vehicle communication network can exchange information with each other.

The torque connectors 113 and 213 are connected to the torque sensor 94. Specifically, the first torque connector 113 is connected to a first sensor unit 194 (refer to FIG. 1) of the torque sensor 94. The second torque connector 213 is connected to the second sensor unit 294 of the torque sensor 94 (refer to FIG. 1). The first torque sensor input circuit 118 is connected to the first control unit 130 and the second control unit 230 through a wiring 31. The second torque sensor input circuit 218 is connected to the first control unit 130 and the second control unit 230 through a wiring 32. As a result, a detection value of the first sensor unit 194 and a detection value of the second sensor unit 294 in the torque sensor 94 are input to the control units 130 and 230 in a hardware manner.

The first inverter circuit 120 is, for example, a three-phase inverter having a switching element (not shown), and converts an electric power supplied to the first motor winding 180. The on/off operation of the switching element of the first inverter circuit 120 is controlled based on a control signal output from the first control unit 130. The second inverter circuit 220 is, for example, a three-phase inverter having a switching element (not shown), and converts an electric power supplied to the second motor winding 280. The on/off operation of the switching element of the second inverter circuit 220 is controlled based on a control signal output from the second control unit 230.

The first current sensor 125 detects a first U-phase current Iu1, a first V-phase current Iv1, and a first W-phase current Iw1, which are supplied to the respective phases of the first motor winding 180, and outputs the detection values to the first control unit 130. The second current sensor 225 detects a second U-phase current Iu2, a second V-phase current Iv2, and a second W-phase current Iw2, which are supplied to the respective phases of the second motor winding 280, and outputs the detection values to the second control unit 230. Hereinafter, the U-phase current, the V-phase current, and the W-phase current are collectively referred to as "phase current" or "three-phase current" as appropriate. A d-axis current and a q-axis current are collectively referred to as "dq-axis current" as appropriate. The same applies to the voltage.

The first rotation angle sensor 126 detects a rotation angle of the motor 80 and outputs the detected rotation angle to the first control unit 130. The second rotation angle sensor 226 detects a rotation angle of the motor 80 and outputs the detected rotation angle to the second control unit 230. According to the present embodiment, an electric angle based on the detection value of the first rotation angle sensor 126 is defined as a first electric angle EleAng1, and an electric angle based on the detection value of the second rotation angle sensor 226 is defined as a second electric angle EleAng2.

The first temperature sensor 127 detects a temperature of the first system L1. According to the present embodiment, the first temperature sensor 127 is disposed in the vicinity of first inverter circuit 120 and detects a temperature of the first inverter circuit 120. The first temperature sensor 127 may be provided for each switching element or one or multiple first temperature sensors 127 may be provided for the entire first inverter circuit 120. The second temperature sensor 227 detects a temperature of the second system L2. According to the present embodiment, the second temperature sensor 227 is provided in the vicinity of the second inverter circuit 220, and detects a temperature of the second inverter circuit 220. The second temperature sensor 227 may be provided for each switching element or one or multiple second temperature sensors 220 may be provided for the entire second inverter circuit 220. The temperature sensors 127 and 227 may detect temperatures of components other than the inverter circuits 120 and 220, such as the motor windings 180 and 280.

The first control unit 130 includes an information acquisition unit 131, an abnormality monitoring unit 135, a drive control unit 140, a communication unit 170, and the like. The second control unit 230 includes an information acquisition unit 231, an abnormality monitoring unit 235, a drive control unit 240, and a communication unit 270. The control units 130 and 230 are mainly configured by microcomputers. Each processing in the control units 130 and 230 may be software processing by executing a program stored in advance in a tangible memory device such as a ROM by a CPU, or may be hardware processing by a dedicated electronic circuit.

The information acquisition unit 131 acquires information from a vehicle communication network through the vehicle communication circuit 117. The information acquisition unit 131 acquires the detection value of the torque sensor 94 from the torque sensor input circuits 118 and 218. In addition, the information acquisition unit 131 acquires detection values from the current sensor 125, the rotation angle sensor 126, and the temperature sensor 127. The information acquisition unit 231 acquires information from the vehicle communication network through the vehicle communication circuit 217. The information acquisition unit 231 acquires the detection value of the torque sensor 94 from the torque sensor input circuits 118 and 218. The information acquisition unit 231 acquires detection values from the current sensor 225, the rotation angle sensor 226, and the temperature sensor 227. The detection value acquired from each sensor may be analog data or digital data.

The abnormality monitoring unit 135 monitors the abnormality of an energization path extending from the battery to the motor winding 180 through the power supply connector 111, the power supply circuit 116, and the inverter circuit 120, and the control information, which is various information used for the drive control of the motor 80. The abnormality monitoring unit 235 monitors the abnormality of an energization path extending from the battery to the motor winding 280 through the power supply connector 211, the power supply circuit 216, and the inverter circuit 220, and the control information, which is various information used for the drive control of the motor 80.

The drive control unit 140 generates and outputs a control signal for controlling the on/off operation of the switching element of the inverter circuit 120 with the use of the control information. The on/off operation of the switching element of the inverter circuit 120 is controlled based on the control signal, to thereby control the energization of the motor winding 180. The drive control unit 240 generates and outputs a control signal for controlling the on/off operation of the switching element of the inverter circuit 220 with the use of the control information. The on/off operation of the switching element of the inverter circuit 220 is controlled based on the control signal, to thereby control the energization of the motor winding 280.

Figure 3:
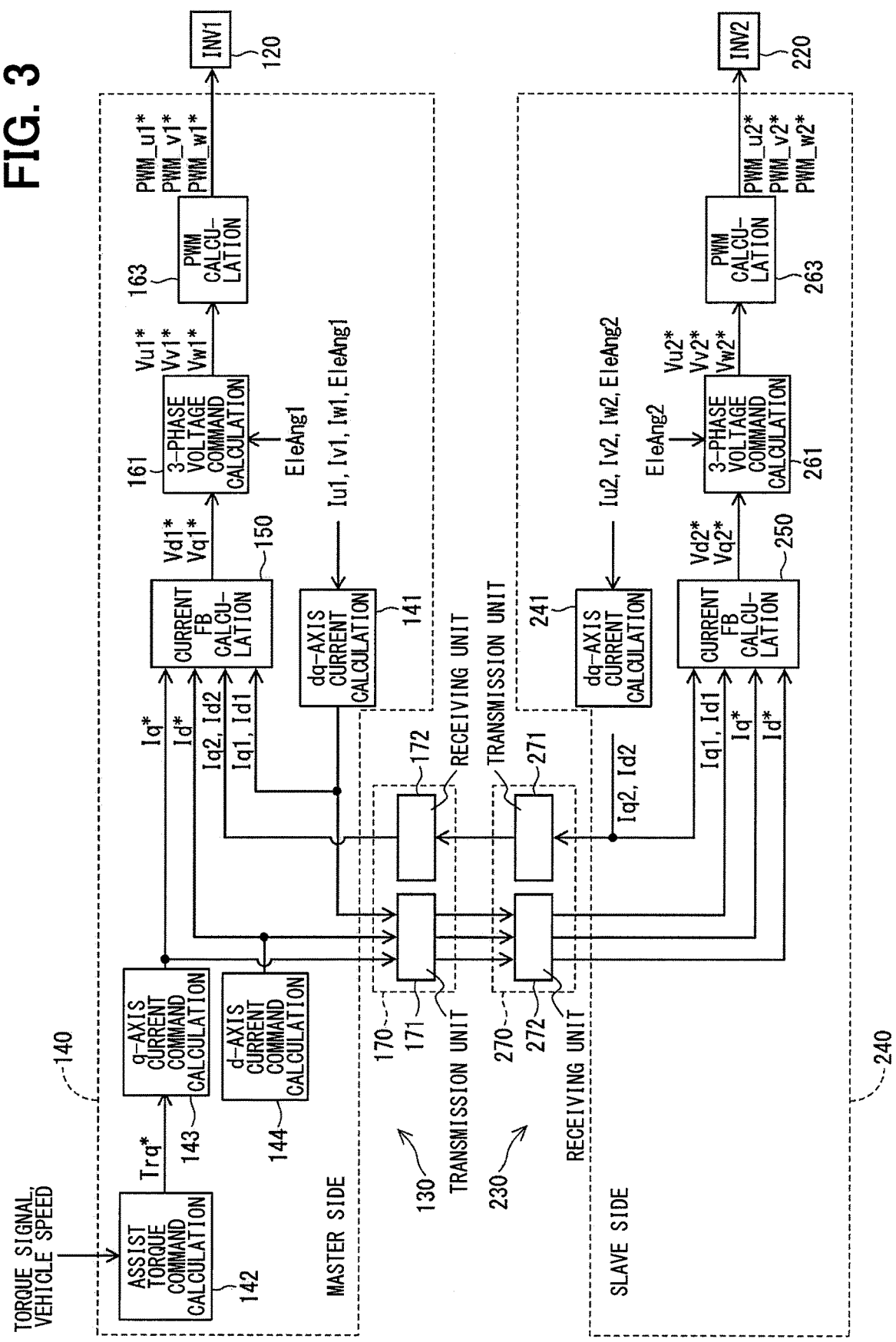
FIG. 3 is a block diagram illustrating a drive control unit according to the embodiment.

The communication unit 170 includes a transmission unit 171 and a receiving unit 172 (refer to FIG. 3 and so on). The communication unit 270 includes a transmission unit 271 and a receiving unit 272 (refer to FIG. 3). The control units 130 and 230 include communication units 170 and 270, respectively, and are provided so as to be able to communicate with each other between the control units 130 and 230. Hereinafter, the communication between the control units 130 and 230 is referred to as "inter-microcomputer communication" as appropriate. As a communication method of the inter-microcomputer communication, any method such as a serial communication such as SPI or SENT, a CAN communication, or the like may be used.

Figure 4:
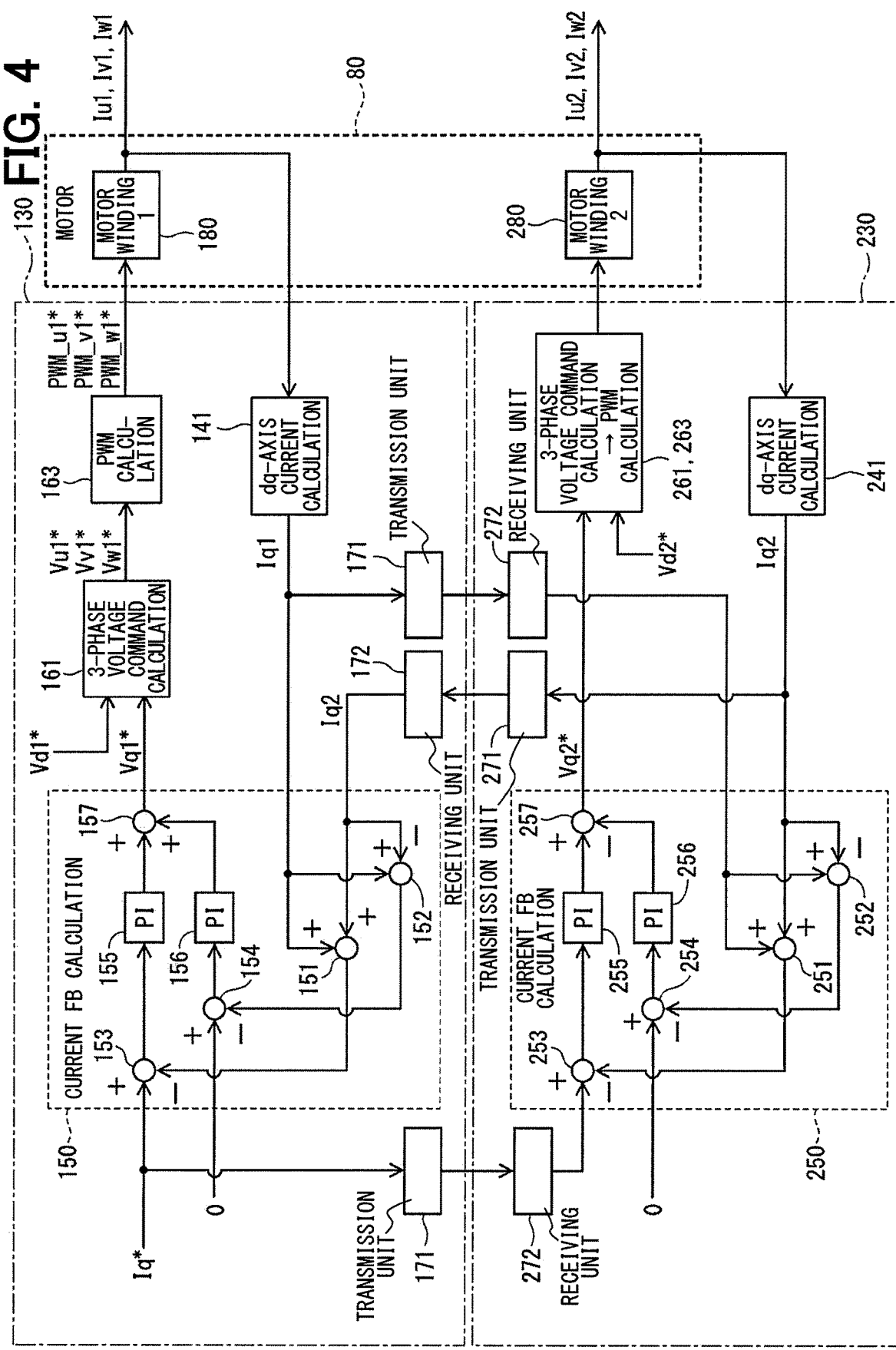
FIG. 4 is a block diagram illustrating a current feedback calculation unit according to the embodiment.

The drive control units 140 and 240 are shown in FIGS. 3 and 4. According to the present embodiment, a drive signal is generated by so-called "sum and difference control" which controls the current sum and the current difference in two systems. According to the present embodiment, the first control unit 130 is a master device and the second control unit 230 is a slave device, and the drive control units 140 and 240 both generate a drive signal with the use of a command value (in the present embodiment, a current command value) calculated by the drive control unit 140.

As shown in FIG. 3, the drive control unit 140 includes a dq-axis current calculation unit 141, an assist torque command calculation unit 142, a q-axis current command calculation unit 143, a d-axis current command calculation unit 144, a current feedback calculation unit 150, a three-phase voltage command calculation unit 161, a PWM calculation unit 163, and the like. Hereinafter, the feedback is referred to as "FB" as appropriate.

The dq-axis current calculation unit 141 performs dq-axis transformation on the phase currents Iu1, the Iv1, and the Iw1 acquired from the first current sensor 125 with the use of the electric angle EleAng1, and calculates dq-axis current detection values Id1 and Iq1. The assist torque command calculation unit 142 calculates an assist torque command value Trq* as a torque command value based on a torque signal acquired from the torque sensor 94 through the torque sensor input circuit 118, a vehicle speed acquired from the vehicle communication network through the vehicle communication circuit 117, and the like. The assist torque command value Trq* is output to the q-axis current command calculation unit 143.

The q-axis current command calculation unit 143 calculates a q-axis current command value Iq* based on the assist torque command value Trq*. The q-axis current command value Iq* according to the present embodiment is a q-axis current value of a two-system total required for outputting the torque of the assist torque command value Trq*. The q-axis current value is obtained by multiplying the assist torque command value Trq* by a motor torque constant. The d-axis current command calculation unit 144 calculates a d-axis current command value Id*.

The current feedback calculation unit 150 performs a current feedback calculation based on the dq-axis current command values Id* and Iq* and the dq-axis current detection values Id1 and Iq1, and Id2 and Iq2, and calculates dq-axis voltage command values Vd1* and Vq1*. The details of the current feedback calculation will be described later.

The three-phase voltage command calculation unit 161 performs inverse dq transformation with the use of the dq-axis voltage command values Vd1* and Vq1*, and the electric angle EleAng1, and calculates three-phase voltage command values Vu1*, Vv1*, and Vw1*. The PWM calculation unit 163 calculates the PWM signals PWM_u1*, PWM_v1*, and PWM_w1* based on the three-phase voltage command values Vu1*, the Vv1*, and the Vw1*. The PWM signals PWM_u1*, PWM_v1*, and PWM_w1* are output to the first inverter circuit 120.

The transmission unit 171 transmits the dq-axis current command values Id* and Iq* and the dq-axis current detection values Id1 and Iq1 to the second control unit 230 as the values involved in the current control. The receiving unit 172 receives the dq-axis current detection values Id2 and Iq2 from the second control unit 230 as the values involved in the current control.

The drive control unit 240 includes a dq-axis current calculation unit 241, a current feedback calculation unit 250, a three-phase voltage command value calculation unit 261, and a PWM calculation unit 263. The dq-axis current calculation unit 241 performs dq-axis transformation on the phase currents Iu2, the Iv2, and the Iw2 acquired from the current sensor 225 with the use of an electric angle EleAng2, and calculates dq-axis current detection values Id2 and Iq2.

The current feedback calculation unit 250 performs a current feedback calculation based on the dq-axis current command values Id* and Iq* and the dq-axis current detection values Id1, Iq1, Id2 and Iq2, and calculates dq-axis voltage command values Vd2* and Vq2*. According to the present embodiment, when both the systems L1 and L2 are normal, the current feedback calculation is performed with the use of the dq-axis current command value transmitted from the first control unit 130. In other words, the first control unit 130 and the second control unit 230 perform current feedback calculation with the use of the same current command values Id* and Iq*. Although not shown, the drive control unit 240 includes an assist torque command calculation unit and a dq-axis current command calculation unit a dq-axis current command calculation unit in the same manner as the drive control unit 140 of the first control unit 130, and the calculated values are used for, for example, a backup control to be described later. The calculation in the assist torque command calculation unit and the dq-axis current command calculation unit of the drive control unit 240 may be performed when necessary, for example, at the time of single-system driving by the second system L2, or may be performed constantly to avoid a calculation delay.

The three-phase voltage command calculation unit 261 performs inverse dq transformation with the use of the dq-axis voltage command value Vd2* and Vq2*, and the electric angle EleAng2, and calculates three-phase voltage command values Vu2*, Vv2*, and Vw2*. The second PWM calculation unit 263 calculates PWM signals PWM_u2*, PWM_v2*, and PWM_w2* based on the three-phase voltage command values Vu2*, Vv2*, and Vw2*. The PWM signals PWM_u2*, PWM_v2*, and PWM_w2* are output to the second inverter circuit 220.

The transmission unit 271 transmits the dq-axis current detection values Id2 and Iq2 to the first control unit 130 as the values involved in the current control. The receiving unit 272 receives the dq-axis current command values Id* and Iq* and the dq-axis current detection values Id1 and Iq1 from the first control unit 130 as the values involved in the current control.

Details of the current feedback calculation units 150 and 250 will be described with reference to FIG. 4. In FIG. 4, for convenience, blocks of the transmission units 171 and 271 are shown separately. In addition, the three-phase voltage command calculation unit 261 and the PWM calculation unit 263 are collectively described in one block, and the inverter circuits 120, 220, and the like are omitted. In FIG. 4, the current feedback calculation involved in the q-axis will be mainly described. The current feedback calculation for the d-axis is the same as that for the q-axis, and therefore a description of the d-axis will be omitted.

The current feedback calculation unit 150 includes an adder 151, subtractors 152 to 154, controllers 155 and 156, and an adder 157. The adder 151 adds the q-axis current detection values Iq1 and Iq2 to calculate a q-axis current sum Iq_a1. The subtractor 152 subtracts the q-axis current detection value Iq2 from the q-axis current detection value Iq1 to calculate a q-axis current difference Iq_d1.

The subtractor 153 subtracts the q-axis current sum Iq_a1 from the q-axis current command value Iq* to calculate a current sum deviation ΔIq_a1. The subtractor 154 subtracts the q-axis current difference Iq_d1 from the current difference command value to calculate a current difference deviation ΔIq_d1. According to the present embodiment, the current difference command value is set to 0, and the control is performed so as to eliminate a current difference between the systems. The current difference command value may be set to a value other than 0, and the control may be performed so that a desired current difference occurs between the systems. The same applies to the current difference command value input to the subtractor 254.

The controller 155 calculates a basic q-axis voltage command value Vq_b1* by, for example, PI calculation or the like so that the current sum deviation ΔIq_a1 becomes 0. The controller 156 calculates a q-axis voltage difference command value Vq_d1* by, for example, a PI calculation or the like so that the current difference deviation ΔIq_d1 becomes 0. The adder 157 adds the basic q-axis voltage command value Vq_b1* and the q-axis voltage difference command value Vq_d1* to calculate a q-axis voltage command value Vq1*.

The current feedback calculation unit 250 includes an adder 251, subtractors 252 to 254, controllers 255 and 256, and a subtractor 257. The adder 251 adds the q-axis current detection values Iq1 and Iq2 to calculate a q-axis current sum Iq_a2. The subtractor 252 subtracts the q-axis current detection value Iq2 from the q-axis current detection value Iq1 to calculate a q-axis current difference Iq_d2. According to the present embodiment, since the adders 151 and 251 use the same value, the q-axis current sums Iq_a1 and Iq_a2 have the same value. The same applies to the q-axis current differences Iq_d1 and Iq_d2.

The subtractor 253 subtracts the q-axis current sum Iq_a2 from the q-axis current command value Iq* to calculate a current sum deviation ΔIq_a2. The subtractor 254 subtracts the q-axis current difference Iq_d2 from the current difference command value to calculate a current difference deviation ΔIq_d2. The current difference command value input to the subtractor 254 may be a value transmitted from the first control unit 130, or may be a value internally set by the second control unit 230.

The controller 255 calculates a basic q-axis voltage command value Vq_b2* by, for example, PI calculation or the like so that the current sum deviation ΔIq_a2 becomes 0. The controller 256 calculates a q-axis voltage difference command value Vq_d2* by, for example, PI calculation or the like so that the current difference deviation ΔIq_d2 becomes 0. The subtractor 257 subtracts the q-axis voltage difference command value Vq_d2* from the basic q-axis voltage command value Vq_b2* to calculate a second q-axis voltage command value Vq2*.

Although FIGS. 3 and 4 show examples in which the dq-axis current command values Id* and Iq* are transmitted as command values from the first control unit 130 to the second control unit 230, the transmitted command values may be the assist torque command value trq*. Alternatively, the calculation in the current feedback calculation unit 250 may be performed by the first control unit 130, and the voltage command value or the PWM command value may be transmitted from the first control unit 130 to the second control unit 230. According to the present embodiment, not only the energization path extending from the battery to the motor windings 180 and 280 but also the control units 130 and 230 and various sensors are duplicated. For that reason, even if an abnormality occurs in one of the systems, the drive control of the motor 80 can be continued.

Incidentally, for example, as the reference example, when an abnormality is confirmed after the abnormality has been detected and the abnormality continuation time has elapsed for a predetermined time or more, and the control is switched after the abnormality has been confirmed, there is a possibility that the output from the motor 80 becomes abnormal during a period from the abnormality detection to the abnormality confirmation. Therefore, according to the present embodiment, when an abnormality has been detected, the process immediately shifts to the abnormality detection time backup control, which is the first backup control, and when the abnormality has been confirmed, the process shifts to the abnormality confirmation time backup control, which is the second backup control. The abnormality detection time backup control and the abnormality confirmation time backup control may be different from each other or the same as each other. The details of the backup control will be described later.

Figure 5:
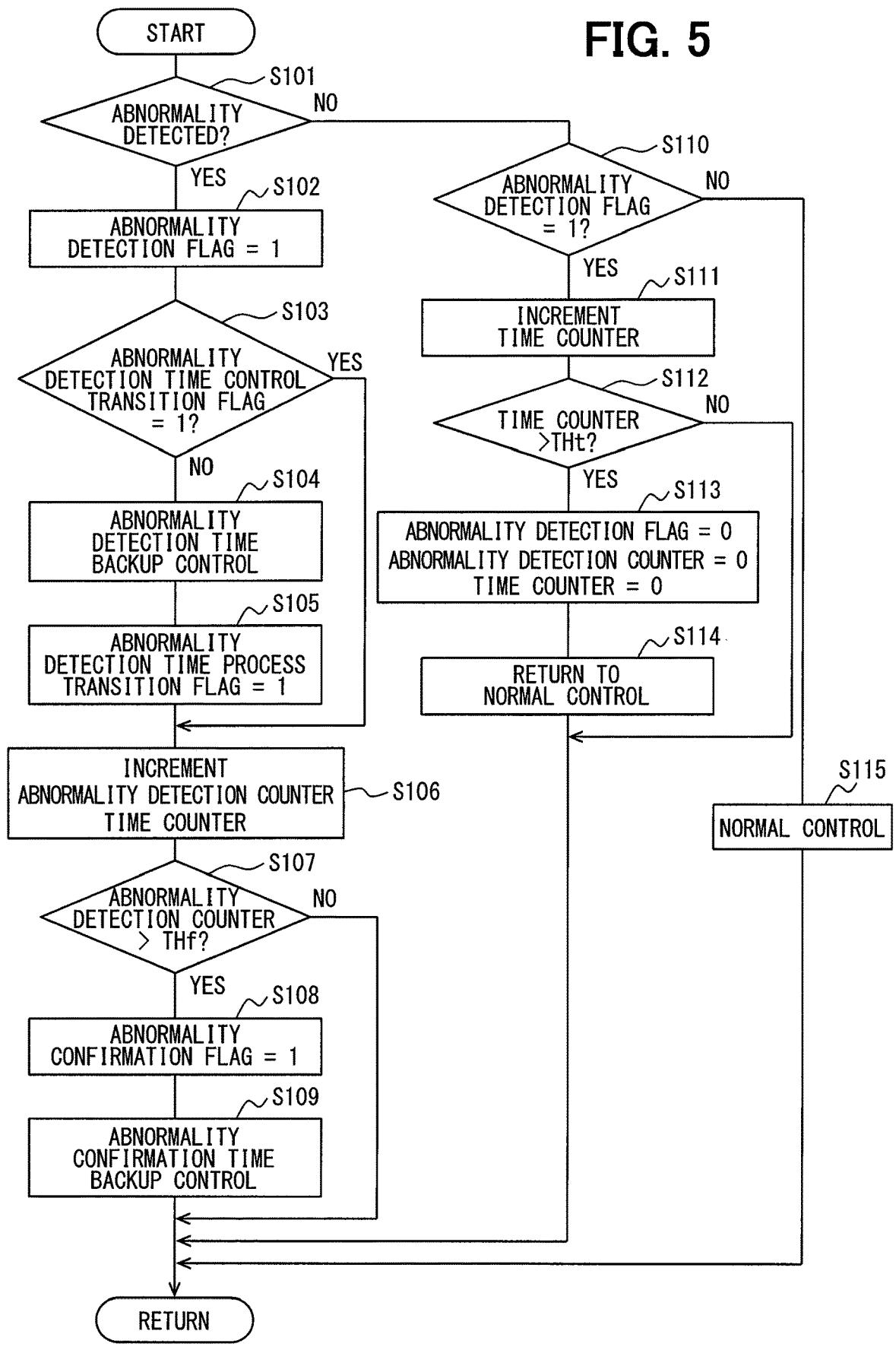
FIG. 5 is a flowchart illustrating a backup transition process according to the embodiment.

A backup transition process according to the present embodiment will be described with reference to a flowchart of FIG. 5. This process is performed at predetermined cycle in each of the control units 130 and 230. Hereinafter, "Step" of Step S101 is omitted, and the symbol "S" will be simply referred to. Since the processing in the control units 130 and 230 is substantially the same, the processing in the first control unit 130 will be described now. The second control unit 230 monitors the abnormality of the second system L2 instead of the first system L1.

In the first S101, the first control unit 130 determines whether or not an anomaly has been detected in the first system L1. In this example, the first control unit 130 detects (1) the abnormality of the torque sensor 94 and the rotation angle sensor 126, (2) the abnormality of the current sensor 125, (3) the abnormality of the motor winding 180, the inverter circuit 120, and the power supply circuit 116, and (4) the abnormality of the vehicle communication network and the temperature sensor 127. An abnormality detection method may be any known method such as, for example, detection with a lower limit value or an upper limit value affixed, abnormality detection by comparison of multiple values, or the like. When it is determined that no anomaly has been detected in the first system L1 (NO in S101), the process proceeds to S110. When it is determined that an anomaly has been detected in the first system L1 (YES in S101), the process proceeds to S102.

In S102, the first control unit 130 sets an abnormality detection flag. In the figure, a state in which each flag is set is set to "1", and a state in which the flag is not set is set to "0". In S103, the first control unit 130 determines whether or not an abnormality detection time control transition flag is set. When it is determined that the abnormality detection time control transition flag has been set (YES in S103), the abnormality detection time backup control is continued, and the process shifts to S106. When it is determined that the abnormality detection time control transition flag has not been set (NO in S103), the process shifts to S104.

In S104, the first control unit 130 shifts to the abnormality detection time backup control. The first control unit 130 and the second control unit 230 transmit and receive necessary information in accordance with the backup control process to be shifted. In S105, the first control unit 130 sets the abnormality detection time control transition flag. In S106, the first control unit 130 increments an abnormality detection counter and a time counter. The abnormality detection counter is a counter for counting the number of times of abnormality detections, and the time counter is a counter for counting a time from the detection of the abnormality.

In S107, the first control unit 130 determines whether or not the count value of the abnormality detection counter is larger than a confirmation determination threshold THf. When it is determined that the count value of the abnormality detection counter is equal to or smaller than the confirmation determination threshold THf (NO in S107), the abnormality detection counter does not perform the processes of S108 and S109. When it is determined that the count value of the abnormality detection counter is larger than the confirmation determination threshold THf (YES in S107), the process proceeds to S108. In S108, the first control unit 130 sets an abnormality confirmation flag. In S109, the first control unit 130 transmits to the second control unit 230 information indicating that the process shifts to the abnormality confirmation time backup control, and shifts to the abnormality confirmation time backup control. The first control unit 130 and the second control unit 230 transmit and receive necessary information in accordance with the backup control process to be shifted.

In S110 to which the process shifts when no abnormality has been detected in the first system L1 (NO in S101), the first control unit 130 determines whether or not the abnormality detection flag has been set. When it is determined that the abnormality detection flag has not been set (NO in S110), the process proceeds to S115 and a normal control is continued. When the information indicating the transition to the abnormality detection time backup control or the abnormality confirmation time backup control is received from the second control unit 230, the processing according to the backup control to be performed is performed as appropriate. If it is determined that the abnormality detection flag has been set (YES in S110), the process proceeds to S111.

In S111, the first control unit 130 increments the time counter. In S112, the first control unit 130 determines whether or not the count value of the time counter is larger than an elapse determination threshold THt. When it is determined that the count value of the time counter is equal to or smaller than the elapse determination threshold THt (NO in S112), the processes in S113 and S114 are not performed, and the abnormality detection time backup control is continued. When it is determined that the count value of the time counter is larger than the elapse determination threshold THt (YES in S112), the process proceeds to S113. In S113, the first control unit 130 resets the abnormality detection flag, the abnormality detection counter, and the time counter.

In S114, since an abnormality has been detected in the first system L1 but the abnormality has not been determined within a predetermined period of time, the first control unit 130 returns to the normal control on the assumption that the abnormality is temporary. In the case of returning to the normal control, the return may be made immediately, or may be made on the basis of a gradual increase process or a weight function.

FIG. 6 shows the abnormality detection time backup control and the abnormality confirmation time backup control according to the present embodiment. According to the present embodiment, the abnormality detection time backup control and the abnormality confirmation time backup control are selected in accordance with the abnormality occurrence location.

(1) When an abnormality has occurred in the torque sensor 94 or the rotation angle sensors 126 and 226, the abnormality detection time backup control is set to (A) a single-system driving control, (B) an inter-microcomputer communication substitute control, or (C) a cross input substitute control. When the abnormality detection time backup control is (A) the single-system driving control, the abnormality confirmation time backup control is also set to (A) the single-system driving control. When the abnormality detection time backup control is (B) the inter-microcomputer communication substitute control, the abnormality confirmation time backup control is set to (A) the single-system driving control or (B) the inter-microcomputer communication substitute control. When the abnormality detection time backup control is (C) the cross input substitute control, the abnormality confirmation time backup control is set to (A) the single-system driving control or (C) the cross input substitute control.

(2) When an abnormality occurs in the current sensors 125 and 225, the abnormality detection time backup control is set to (A) the single-system driving control or (C) the cross input substitute control. When the abnormality detection time backup control is (A) the single-system driving control, the abnormality confirmation time backup control is also set to (A) the single-system driving control. When the abnormality detection time backup control is (C) the cross input substitute control, the abnormality confirmation time backup control is set to (A) the single-system driving control or (C) the cross input substitute control.

(3) When an abnormality occurs in the motor windings 180 and 280, the inverter circuits 120 and 220, and the power supply circuits 116 and 216, the abnormality detection time backup control and the abnormality confirmation time backup control are set to (A) the single-system driving control. The motor windings 180 and 280, the inverter circuits 120 and 220, and the power supply circuits 116 and 216 are referred to as "motor system and power supply system" in the drawing.

(4) When an abnormality has occurred in the vehicle communication network or the temperature sensors 127 and 227, the abnormality detection time backup control is set to (A) the single-system driving control, (B) the inter-microcomputer communication substitute control, (C) the cross input substitute control, or (D) the current limit control. When the abnormality detection time backup control is (A) the single-system driving control, the abnormality confirmation time backup control is also set to (A) the single-system driving control. When the abnormality detection time backup control is (B) the inter-microcomputer communication substitute control, the abnormality confirmation time backup control is set to (A) the single-system driving control, (B) the inter-microcomputer communication substitute control, or (D) the current limit control. When the abnormality detection time backup control is (C) the cross input substitute control, the abnormality confirmation time backup control is set to (A) the single-system driving control, (C) the cross input substitute control, or (D) the current limit control. When the abnormality detection time backup control is (D) the current limit control, the abnormality confirmation time backup control is set to (A) the single-system driving control or (D) the current limit control. The single-system driving control according to the present embodiment corresponds to "normal system driving control", and the inter-microcomputer communication substitute control and the cross input substitute control correspond to "a signal substitute control".

Figure 7:
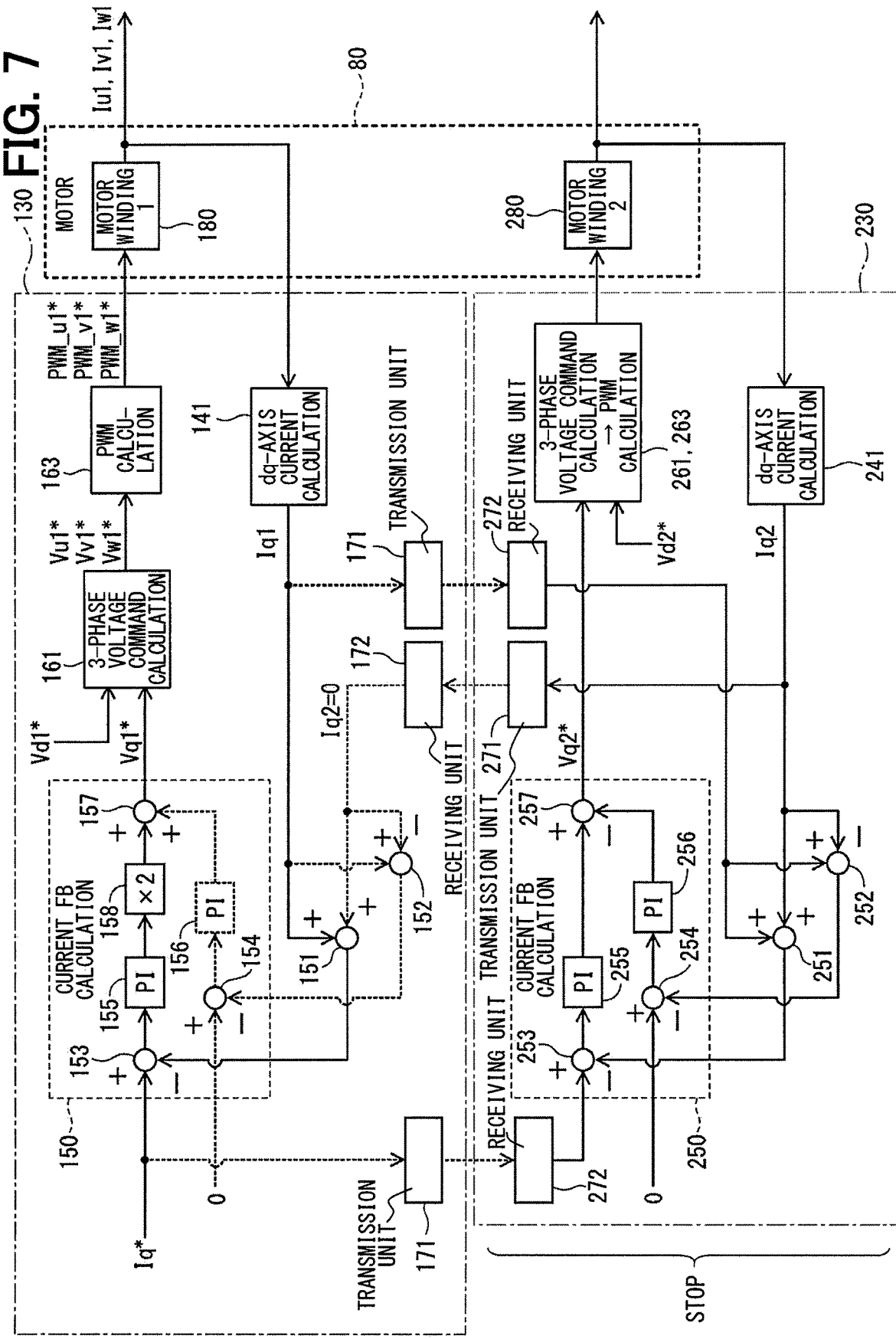
FIG. 7 is a block diagram illustrating a single-system driving according to the embodiment.

(A) The single-system driving control can be selected as the abnormality detection time backup control and the abnormality confirmation time backup control even at the time of abnormality in any location. Details of the single-system driving control will be described with reference to FIGS. 7 and 8. FIG. 7 shows a case in which an abnormality occurs in the second system L2 and the single-system driving is performed in the first system L1. When the single-system driving is performed in the first system L1, the first control unit 130 stops transmitting the current command values Id* and Iq* to the second control unit 230. Further, the first control unit 130 stops the reception of the current detection values Id2 and Iq2 from the second control unit 230, and sets the current detection values Id2 and Iq2 to 0. In the current feedback calculation unit 150, the output conversion unit 158 doubles the output of the sum PI calculation. The PI calculation of the difference in the controller 156 is stopped.

When the first system L1 is abnormal and the single-system driving is performed in the second system L2, the second control unit 230 calculates the assist torque command value Trq* and the current command values Iq* and Id*. Further, the second control unit 230 stops the reception of the current detection values Id1 and Iq1 from the first control unit 130, and sets the current detection values Id1 and Iq1 to 0. The current feedback calculation unit 250 doubles the output of the PI calculation of the sum and stops the PI calculation of the difference in the controller 256.

Figure 8A:
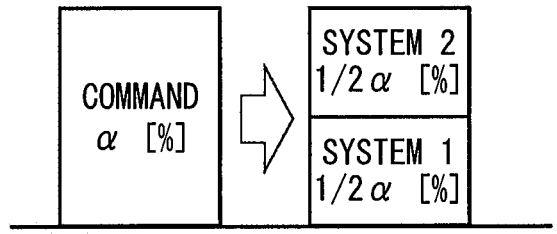
FIG. 8A is an illustrative diagram illustrating an output during single-system driving according to the embodiment.

As shown in FIG. 8A, when the command corresponding to the output demand of the motor 80 is α [%] of 50% or less of a rated value and both of the systems L1 and L2 are normal, (½)×α [%] is output from each of the systems L1 and L2. According to the present embodiment, the first system L1 is controlled by the first control unit 130, and the second system L2 is controlled by the second control unit 230. For that reason, if the second system L2 is simply stopped when an abnormality has occurred in the second system L2, as shown in FIG. 8C, the total output becomes (½)×α [%].

Figure 8B:
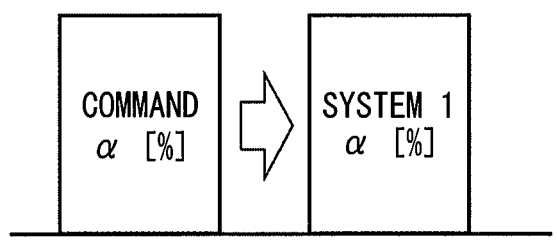
FIG. 8B is an illustrative diagram illustrating the output during the single-system driving according to the embodiment.
Figure 8C:
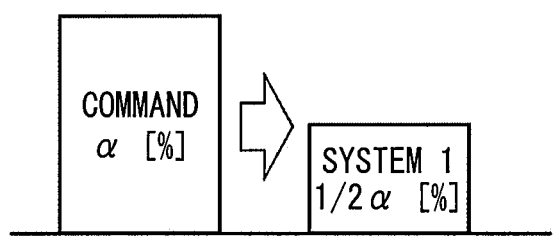
FIG. 8C is an illustrative diagram illustrating the output during single-system driving according to the embodiment.

Therefore, in the single-system driving control according to the present embodiment, as shown in the FIG. 8B, when the single-system driving is performed by the first system L1, the output of the first system L1 is set to α [%] by doubling the output by the output conversion unit 158. As a result, even when the control units 130 and 230 are provided for the respective systems, a decrease in output due to the single-system driving can be prevented. When the command is larger than 50 [%] of the rated value, it is desirable that the output of the first system L1 is set to a maximum output corresponding to the rated value or the like. As shown in FIG. 6, according to the present embodiment, when the single-system driving is selected as the abnormality detection time backup control, the abnormality confirmation time backup control is also set as the single-system driving, and the control is not switched to another control.

(B) The inter-microcomputer communication substitute control can be selected when (1) the torque sensor 94 or the rotation angle sensors 126 and 226 are abnormal, or (4) the vehicle communication network or the temperature sensors 127 and 227 are abnormal. For example, when the first sensor unit 194 of the torque sensor 94 is abnormal, the first control unit 130 acquires the detection value of the second sensor unit 294 from the second control unit 230 by the inter-microcomputer communication, and continues the drive control of the motor 80 with the use of the value of the second sensor unit 294. Further, for example, when the second sensor unit 294 of the torque sensor 94 is abnormal, the second control unit 230 acquires the detection value of the first sensor unit 194 from the first control unit 130 by the inter-microcomputer communication, and continues the drive control of the motor 80 with the use of the value of the first sensor unit 194.

Similarly, when an abnormality has occurred in the first system L1 in the case of an abnormality in the rotation angle sensors 126 and 226, the vehicle communication network, or the temperature sensors 127 and 227, a corresponding value is acquired from the second control unit 230 by the inter-microcomputer communication and used for calculation in the first control unit 130. Similarly, when an abnormality has occurred in the second system L2, a corresponding value is acquired from the first control unit 130 by the inter-microcomputer communication and used for calculation in the second control unit 230.

When (B) the inter-microcomputer communication substitute is performed under the abnormality detection time backup control and the abnormality confirmation time backup control, the information from the torque sensor 94, the rotation angle sensors 126 and 226, and the vehicle communication network, and the information from the temperature sensor 127 may be constantly shared by inter-microcomputer communication between the control units 130 and 230, or may be acquired as necessary when the abnormality occurs.

(C) The cross input substitute control can be selected (1) when the torque sensor 94 or the rotation angle sensors 126 and 226 are abnormal, (3) when the current sensors 125 and 225 are abnormal, or (4) when the vehicle communication network or the temperature sensors 127 and 227 are abnormal. At least one of the information acquired from the torque sensor 94, the rotation angle sensors 126 and 226, the current sensors 125 and 225, the temperature sensors 127 and 227, and the vehicle communication network corresponds to "information involved in the drive control of the rotary electric machine". As described with reference to FIG. 2, the torque sensor input circuits 118 and 218 are connected to the control units 130 and 230 with the use of the wirings 31 and 32. In other words, it can be conceived that the detection value of the torque sensor 94 is cross-input to the control units 130 and 230. In a normal state, the first control unit 130 performs control using a value acquired from the torque sensor input circuit 118, and the second control unit 230 performs control using a value acquired from the torque sensor input circuit 218.

In this example, when the value acquired from the torque sensor input circuit 118 is abnormal, the first control unit 130 continues the control using the value acquired from the torque sensor input circuit 218 through the wiring 32 in place of the value acquired from the torque sensor input circuit 118. When the value acquired from the torque sensor input circuit 218 is abnormal, the second control unit 230 continues the control using the value acquired from the torque sensor input circuit 118 through the wiring 31 in place of the value acquired from the torque sensor input circuit 218.

Although not shown in FIG. 2, when (C) the cross input substitute is selected as the abnormality detection time backup control or the abnormality confirmation time backup control in the case of the abnormality of the sensor or the like other than the torque sensor 94, the detection values and the like are connected by wiring so as to be cross-input to the respective control units 130 and 230. When (C) the cross input substitute is not performed as the backup control, wirings for cross input of the respective sensor values such as the wirings 31 and 32 can be omitted.

(D) The current limit control can be selected (4) when the vehicle communication network or the temperature sensors 127 and 227 are abnormal. In the current limit control, the current limit is performed while the control in the two systems is continued with the use of the same value as that in the normal state. In other words, according to the present embodiment, the different abnormality detection time backup control can be selected in accordance with the abnormality occurrence location. Similarly, different abnormality confirmation time backup control can be selected in accordance with the abnormality occurrence location.

Figure 9:
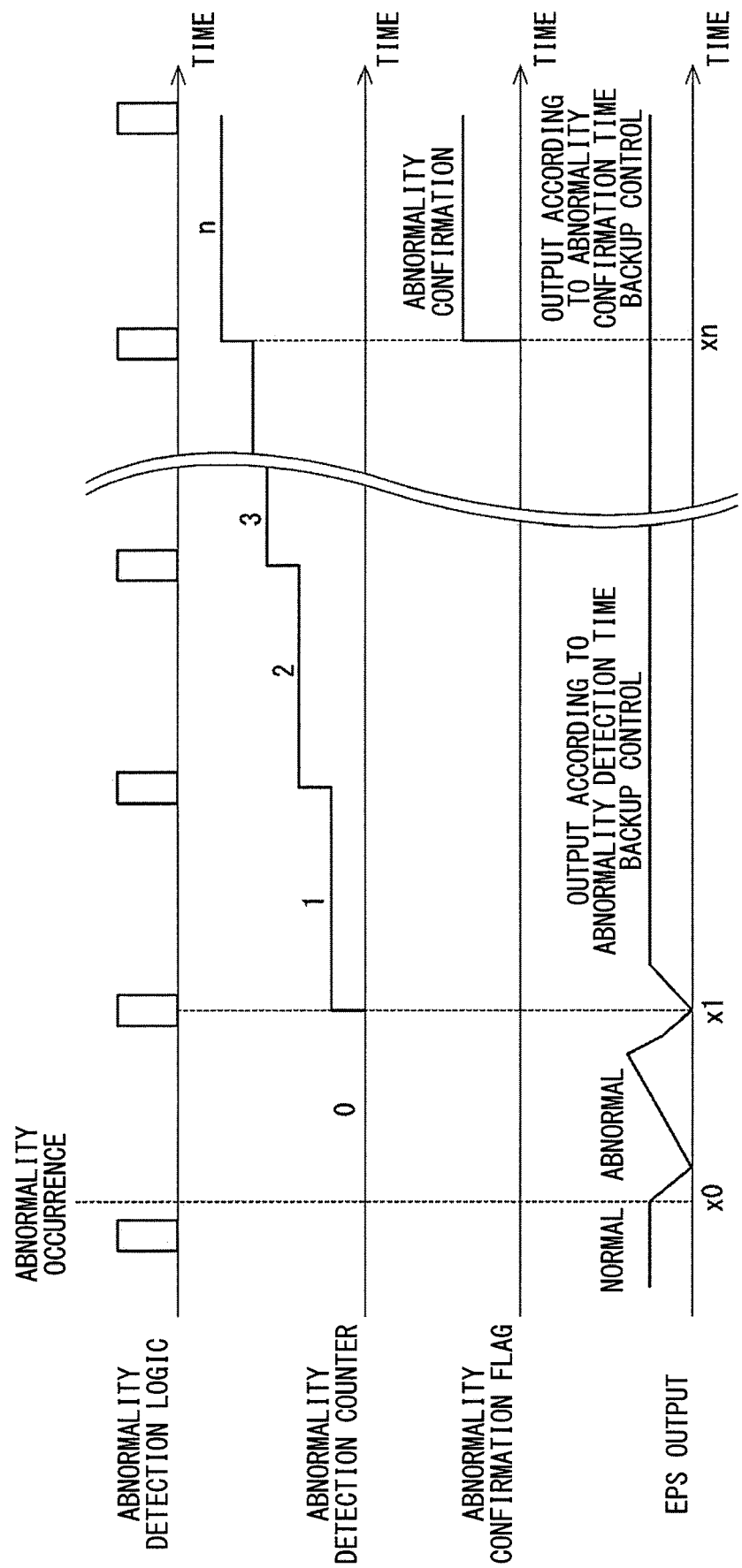
FIG. 9 is a time chart illustrating an EPS output according to the embodiment.
Figure 10:
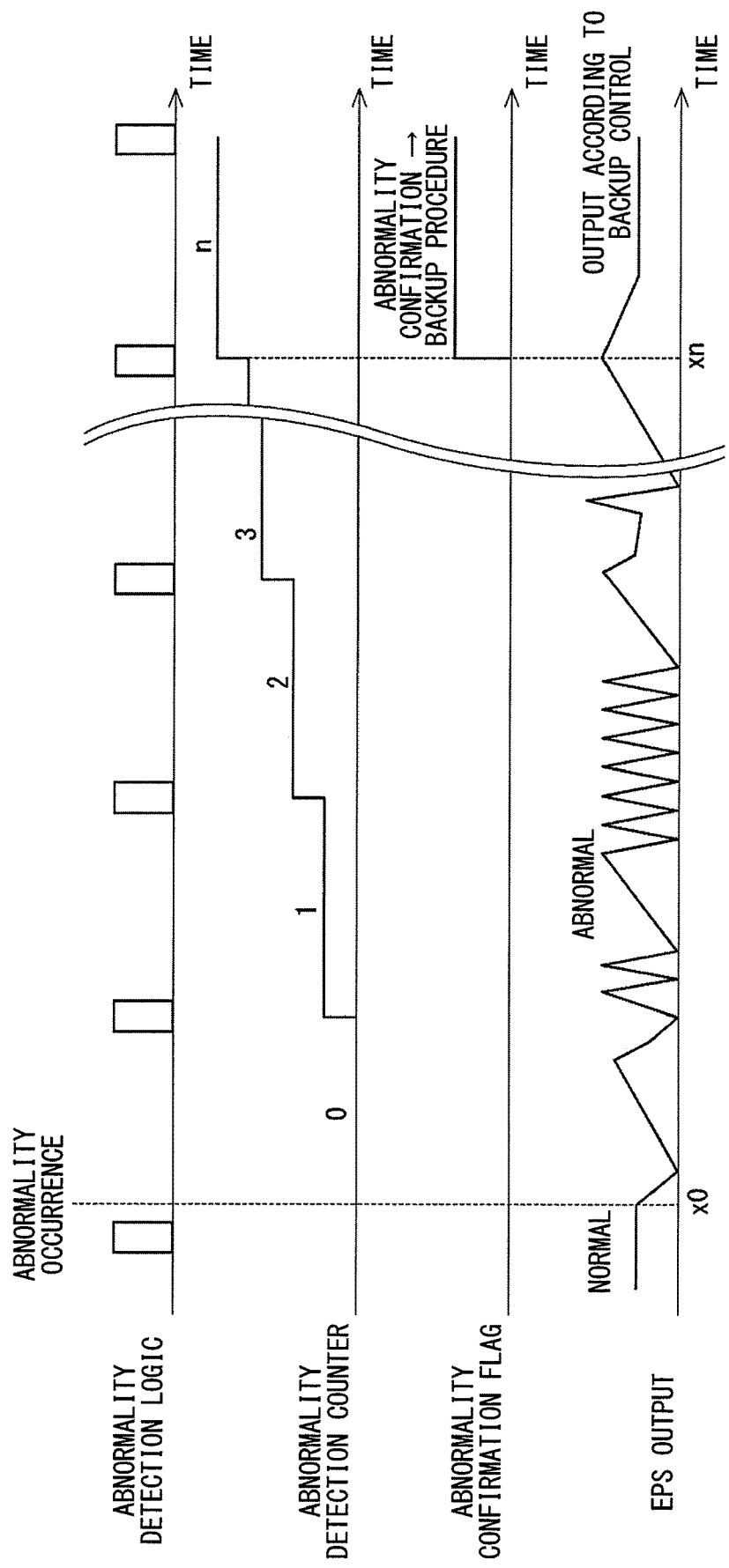
FIG. 10 is a time chart illustrating the EPS output according to a reference example.

The output of the EPS will be described with reference to time charts of FIGS. 9 and 10. FIGS. 9 and 10 show a processing timing of an abnormality detection logic, an abnormality detection counter, an abnormality confirmation flag, and an EPS output from tops of the figure. FIG. 10 is a reference example showing an example in which an abnormality is confirmed when the count value of the abnormality detection counter reaches a predetermined value n, and after the abnormality has been confirmed, the process shifts to the backup control. For example, since the control is performed on the basis of the detection value which is abnormal from a time x0 at which an abnormality occurs in the sensor or the like until a time xn at which the abnormality is confirmed, there is a possibility that the EPS output becomes abnormal over a relatively long period.

Therefore, according to the present embodiment, as shown in FIG. 9, when an abnormality is detected by an abnormality detection logic at a time x1 immediately after the occurrence of the abnormality, the process immediately shifts to the abnormality detection time backup control. For that reason, according to the present embodiment, a period in which the EPS output is likely to be abnormal can be shortened as much as possible. When the abnormality is confirmed at the time xn, the process shifts to the abnormality confirmation time backup control. Although the EPS outputs at the time of the normal, the abnormality detection time backup control, and the abnormality confirmation time backup control are described as being equal to each other, the outputs may be different from each other depending on the selected backup control.

As described above, the motor control device 10 according to the present embodiment controls the drive of the motor 80 including the multiple motor windings 180 and 280, and includes the multiple inverter circuits 120 and 220 and the multiple control units 130 and 230. The inverter circuits 120 and 220 are provided for the respective motor winding 180 and 280. When combinations of the motor windings 180 and 280 and the configurations provided for the respective motor windings 180 and 280 are defined as systems, the control units 130 and 230 are provided for the respective systems.

The first control unit 130 includes the drive control unit 140 that controls the energization of the first motor winding 180, which is provided correspondingly, and the abnormality monitoring unit 135 that monitors the abnormality of the monitoring target. According to the present embodiment, the monitoring target of the first control unit 130 includes the power supply circuit 116, the vehicle communication circuit 117, the torque sensor input circuit 118, the inverter circuit 120, the current sensor 125, the rotation angle sensor 126, the temperature sensor 127, the motor winding 180, and the first sensor unit 194 of the torque sensor 94.

The second control unit 230 includes the drive control unit 240 that controls the energization of the second motor winding 280 provided correspondingly, and the abnormality monitoring unit 235 that monitors the abnormality of the monitoring target. According to the present embodiment, the monitoring target of the second control unit 230 includes the power supply circuit 216, the vehicle communication circuit 217, the torque sensor input circuit 218, the inverter circuit 220, the current sensor 225, the rotation angle sensor 226, the temperature sensor 227, the motor winding 280, and the second sensor unit 294 of the torque sensor 94. The monitoring target of the control units 130 and 230 is not limited to the above-described configuration itself, and includes abnormalities in the wiring connected to each configuration, signal abnormalities, and the like.

The drive control units 140 and 240 perform the abnormality detection time backup control during a period from the detection of the abnormality of the monitoring target to the determination of the abnormality, and perform the abnormality confirmation time backup control when the abnormality has been confirmed. According to the present embodiment, when the abnormality has been detected, the process immediately shifts to the abnormality detection time backup control. As a result, the period until the transition to the backup control is shortened as compared with the case in which the transition to the backup control is made after the abnormality has been confirmed, so that an erroneous output of the motor 80 can be reduced.

The abnormality detection time backup control can be set to a normal system drive in which driving of the motor 80 is continued with the use of a normal system which is a system in which no abnormality has been detected, without using an abnormal system which is a system in which the abnormality has been detected. In addition, the abnormality confirmation time backup control can be set to a normal system drive in which driving of the motor 80 is continued with the use of a normal system which is a system in which no abnormality has been detected, without using an abnormal system which is a system in which the abnormality has been detected. As a result, the erroneous output caused by the use of the abnormal system can be prevented.

The control units 130 and 230 can transmit and receive information to and from each other by a communication. The abnormality detection time backup control can be set to a signal substitute control for controlling the energization of the motor windings 180 and 280 with the use of information acquired by a communication from the control unit of the system in which no abnormality has been detected, in place of information of the subject system corresponding to an abnormality location in the system in which the abnormality has been detected. The abnormality confirmation time backup control can be set to a signal substitute control for controlling the energization of the motor windings 180 and 280 with the use of information acquired by a communication from the control unit of the system in which no abnormality has been detected, in place of information of the subject system corresponding to an abnormality location in the system in which the abnormality has been detected. This makes it possible to prevent the control from being performed using the erroneous information.

The first control unit 130 can acquire the information used for driving control of the motor 80 from the second system L2, which is another system, through the wiring 32. The second control unit 230 can acquire the information used for driving control of the motor 80 from the first system L1, which is another system, through the wiring 31. The abnormality detection time backup control can be set to a signal substitute control for controlling the energization of the motor windings 180 and 280 with the use of the information acquired from the system in which an abnormality has not been detected through the wirings 31 and 32, in place of the information of the subject system corresponding to an abnormality location in the system in which the abnormality has been detected. The abnormality confirmation time backup control is a signal substitute control for controlling the energization of the motor windings 180 and 280 with the use of the information acquired from the system in which the abnormality has not been detected through the wirings 31 and 32 in place of the information of the subject system corresponding to the abnormality location in the system in which the abnormality has been detected. This makes it possible to prevent the control from being performed using the erroneous information.

The abnormality detection time backup control can be set to a current limit control for limiting the current supplied to the motor windings 180 and 280. The abnormality confirmation time backup control can be set to a current limit control for limiting the current supplied to the motor windings 180 and 280. This makes it possible to reduce an overcurrent or overheating due to the occurrence of an abnormality.

The abnormality monitoring units 135 and 235 confirm an abnormality when a predetermined abnormality continuation condition has been satisfied. In the present embodiment, when the count value of the abnormality detection counter exceeds a confirmation determination threshold THE within a predetermined time, the abnormality is confirmed. This makes it possible to prevent erroneous confirmation of the abnormality due to a temporary abnormality due to, for example, noise or the like.

When the abnormality has not been confirmed within a predetermined period of time after the abnormality detection, the drive control units 140 and 240 return from the abnormality detection time backup control to the normal control. As a result, even if the control is shifted to the abnormality detection time backup control due to a temporary abnormality, the abnormality detection time backup control can be appropriately restored to the normal state when the abnormality has not been confirmed.

The monitoring target according to the present embodiment includes the torque sensor 94. As a result, when an abnormality occurs in the torque sensor 94, the control can shift to an appropriate backup control. The monitoring target according to the present embodiment includes the rotation angle sensors 126 and 226. As a result, when an abnormality has occurred in the rotation angle sensors 126 and 226, the control can shift to an appropriate backup control.

The electric power steering device 8 includes the motor control device 10, the motor 80, and the reduction gear 89. The motor 80 outputs an assist torque for assisting the driver to steer the steering wheel 91. The reduction gear 89 transmits a driving force of the motor 80 to the steering shaft 92. According to the present embodiment, not only the motor windings 180 and 280 and the inverter circuits 120 and 220, but also control components including the control units 130 and 230 and sensors are systematized into two systems. As a result, even when an abnormality occurs in one of the control components, the drive of the motor 80 can be continued and the steering assist can be continued. In addition, when the control immediately shifts to the abnormality detection time backup control after the abnormality detection, a period in which the output becomes abnormal can be shortened as much as possible, thereby being capable of improving a steering feeling at the time of abnormality detection.

Other Embodiments

In the embodiment described above, the two winding sets, the two drive circuits, and the two control units are provided, which are two systems. In another embodiment, three or more winding sets, drive circuits, and control units may be provided, and three or more systems may be provided. In addition, multiple components of each system may be provided in such a manner that multiple control units are provided in one system, or multiple drive circuits and multiple winding sets are provided in one control unit. In the embodiment described above, when the abnormality detection time backup control is (A) one-system driving, the abnormality confirmation time backup control is also (A) single-system driving. In another embodiment, any one of (A) to (D) may be selected in the abnormality detection time backup control and the abnormality confirmation time backup control, in such a manner that when the abnormality detection value backup control is (A) single-system driving, any one of (B) to (D) is selected as the abnormality confirmation time backup control. The abnormality detection time backup control and the abnormality confirmation time backup control may be controls other than the above (A) to (D). As described in the above embodiment, the abnormality detection time backup control and the abnormality confirmation time backup control may be the same as or different from each other.

In the embodiment described above, when the two systems are normal, the drive control unit controls the current to be supplied to the respective winding sets by the first control unit and the second control unit based on a command value calculated by the first control unit. In another embodiment, the drive control unit may control the current supplied to the winding set based on the command value calculated by each control unit. In the embodiment described above, the drive control unit controls the current to be supplied to the winding set by controlling a sum and a difference. In another embodiment, the energization control may be performed by a control method other than the sum and difference control.

In the embodiment described above, the rotary electric machine is a three-phase brushless motor. In other embodiments, the rotary electric machine is not limited to the brushless motor, but may be any motor. The rotary electric machine is not limited to the motor, and may be a generator, or may be a so-called motor generator having both functions of an electric motor and a generator. In the embodiment described above, the rotary electric machine control device is applied to an electric power steering device. In another embodiment, the rotary electric machine control device may be applied to devices other than the electric power steering device. As described above, the present disclosure is not limited to the embodiments described above, and can be implemented in various forms without departing from the spirit of the present disclosure.

The present disclosure has been described in accordance with the embodiments. However, the present disclosure is not limited to such embodiments and structures. The present disclosure also encompasses various modifications and variations within the scope of equivalents. Also, various combinations and forms, as well as other combinations and forms that include only one element, more, or less, are within the scope and spirit of the present disclosure.

What is claimed is:

1. A rotary electric machine control device for controlling driving of a rotary electric machine including a plurality of winding sets, comprising:
   a plurality of drive circuits provided for the plurality of winding sets in which each drive circuit of the plurality of drive circuits corresponds to a respective winding set of the plurality of winding sets; and
   a plurality of control units provided correspondingly to a plurality of respective systems in which each control unit of the plurality of control units corresponds to a respective system of the plurality of respective systems, each respective system comprising one of the plurality of drive circuits and a respective winding set corresponding to said one of the plurality of drive circuits, each of the plurality of control units configured to control energization of each respective winding set provided correspondingly and monitor an abnormality of a monitoring target, wherein
   each of the plurality of control units includes a CPU,
   each of the plurality of control units are configured to perform an abnormality detection time backup control during a period from detection of the abnormality of the monitoring target to confirmation of the abnormality, the abnormality detection time backup control comprising a backup control for controlling driving of the rotary electric machine during the period from detection of the abnormality of the monitoring target to confirmation of the abnormality, and
   each of the plurality of control units are configured to perform an abnormality confirmation time backup control when the abnormality is confirmed, the abnormality confirmation time backup control comprising a backup control for controlling driving of the rotary electric machine when the abnormality is confirmed, wherein
   when the abnormality detection time backup control comprises a normal system driving control for controlling driving of the rotary electric machine using a normal system, which is a system within which the abnormality of the monitoring target is not detected, without using an abnormal system, which is a system within which the abnormality of the monitoring target is detected, each of the plurality of control units are configured to continue the normal system driving control as the abnormality confirmation time backup control, and when the abnormality detection time backup control comprises other than the normal system driving control, each of the plurality of control units are configured to shift to the normal system driving control as the abnormality confirmation time backup control.

2. The rotary electric machine control device according to claim 1, wherein
the plurality of control units are capable of transmitting and receiving information to and from each other through communication,
the abnormality detection time backup control comprises a signal substitute control for controlling the energization of a respective winding set using the information acquired through communication from the control unit of a system in which the abnormality is not detected, in place of information of a system in which the abnormality is detected.

3. The rotary electric machine control device according to claim 1, wherein
each of the plurality of control unit is capable of acquiring the information used for driving control of the rotary electric machine from another system using a wiring,
the abnormality detection time backup control comprises a signal substitute control for controlling the energization of the respective winding set using the information acquired from the respective system in which the abnormality is not detected through the wiring in place of information of a system in which the abnormality is detected.

4. The rotary electric machine control device according to claim 1, wherein
the abnormality detection time backup control comprises a current limiting control for limiting a current supplied to the respective winding set.

5. The rotary electric machine control device according to claim 1, wherein
the plurality of control units are capable of transmitting and receiving information to and from each other through communication,
the abnormality confirmation time backup control comprises a signal substitute control for controlling the energization of the respective winding set using the information acquired through communication from the control unit of the respective system in which the abnormality is not detected in place of information of a system in which the abnormality is detected.

6. The rotary electric machine control device according to claim 1, wherein
each of the plurality of control unit is capable of acquiring the information used for driving control of the rotary electric machine from another system using a wiring,
the abnormality confirmation time backup control comprises a signal substitute control for controlling the energization of the respective winding set using the information acquired from the respective system in which the abnormality is not detected through the wiring in place of information of a system in which the abnormality is detected.

7. The rotary electric machine control device according to claim 1, wherein
the abnormality confirmation time backup control comprises a current limiting control for limiting a current supplied to the respective winding set.

8. The rotary electric machine control device according to claim 1, wherein
each of the plurality of control units are configured to confirm the abnormality when a predetermined abnormality continuation condition is satisfied.

9. The rotary electric machine control device according to claim 1, wherein
each of the plurality of control units are configured to return from the abnormality detection time backup control to a normal control when the abnormality is not confirmed within a predetermined period after the abnormality detection.

10. The rotary electric machine control device according to claim 1, wherein
the monitoring target includes a torque sensor.

11. The rotary electric machine control device according to claim 1, wherein
the monitoring target includes a rotation angle sensor.

12. The rotary electric machine control device according to claim 1, wherein
each of the plurality of control units further includes a memory that stores a program, and
each of the plurality of control units are realized by the CPU that executes the program stored in the memory.

13. An electric power steering device comprising:
a rotary electric machine including a plurality of winding sets and configured to output an assist torque for assisting a driver to steer a steering member;
a power transmission portion configured to transmit a driving force of the rotary electric machine to a drive target; and
a rotary electric machine control device configured to control driving of the rotary electric machine and including a plurality of driving circuits, in which each drive circuit of the plurality of drive circuits corresponds to a respective winding set of the plurality of winding sets, and a plurality of winding sets, the drive circuits provided for the respective winding sets, a plurality of control units provided correspondingly to a plurality of respective systems in which each control unit of the plurality of control units corresponds to a respective system of the plurality of respective systems, each respective system comprising one of the plurality of drive circuits and a respective winding set corresponding to said one of the plurality of drive circuits, each of the plurality of control units are configured to control energization of the winding set provided correspondingly and monitor an abnormality of a monitoring target, wherein
each of the plurality of control units includes a CPU,
each of the plurality of control units are configured to perform an abnormality detection time backup control during a period from detection of the abnormality of the monitoring target to confirmation of the abnormality, and
each of the plurality of control units are configured to perform an abnormality confirmation time backup control when the abnormality is confirmed, wherein
when the abnormality detection time backup control is a normal system driving control for controlling driving of the rotary electric machine using a normal system which is the system in which the abnormality is not detected without using an abnormal system which is the system in which the abnormality is detected, each of the plurality of control units are configured to continue the normal system driving control as the abnormality confirmation time backup control, and
when the abnormality detection time backup control is other than the normal system driving control, each of the plurality of control units are configured to shift to the normal system driving control as the abnormality confirmation time backup control.

14. The electric power steering device according to claim 13, wherein each of the plurality of control units further includes a memory that stores a program, and each of the plurality of control units are realized by the CPU that executes the program stored in the memory.

* * * * *